July 6, 1948. R. C. FERGASON 2,444,561
CORN HARVESTER
Filed July 16, 1943 4 Sheets-Sheet 1
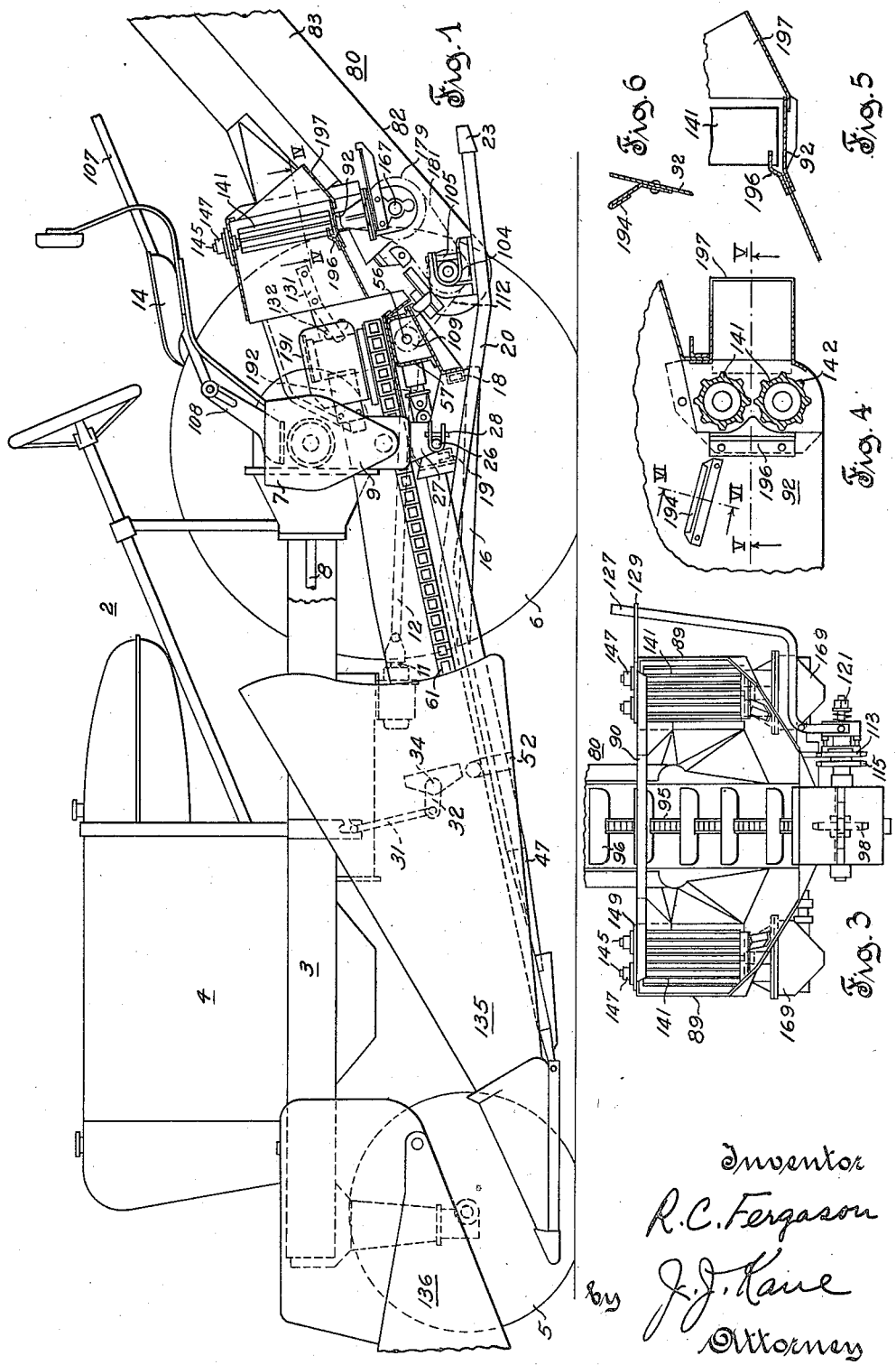
Inventor
R.C. Fergason
by J.J. Kane
Attorney

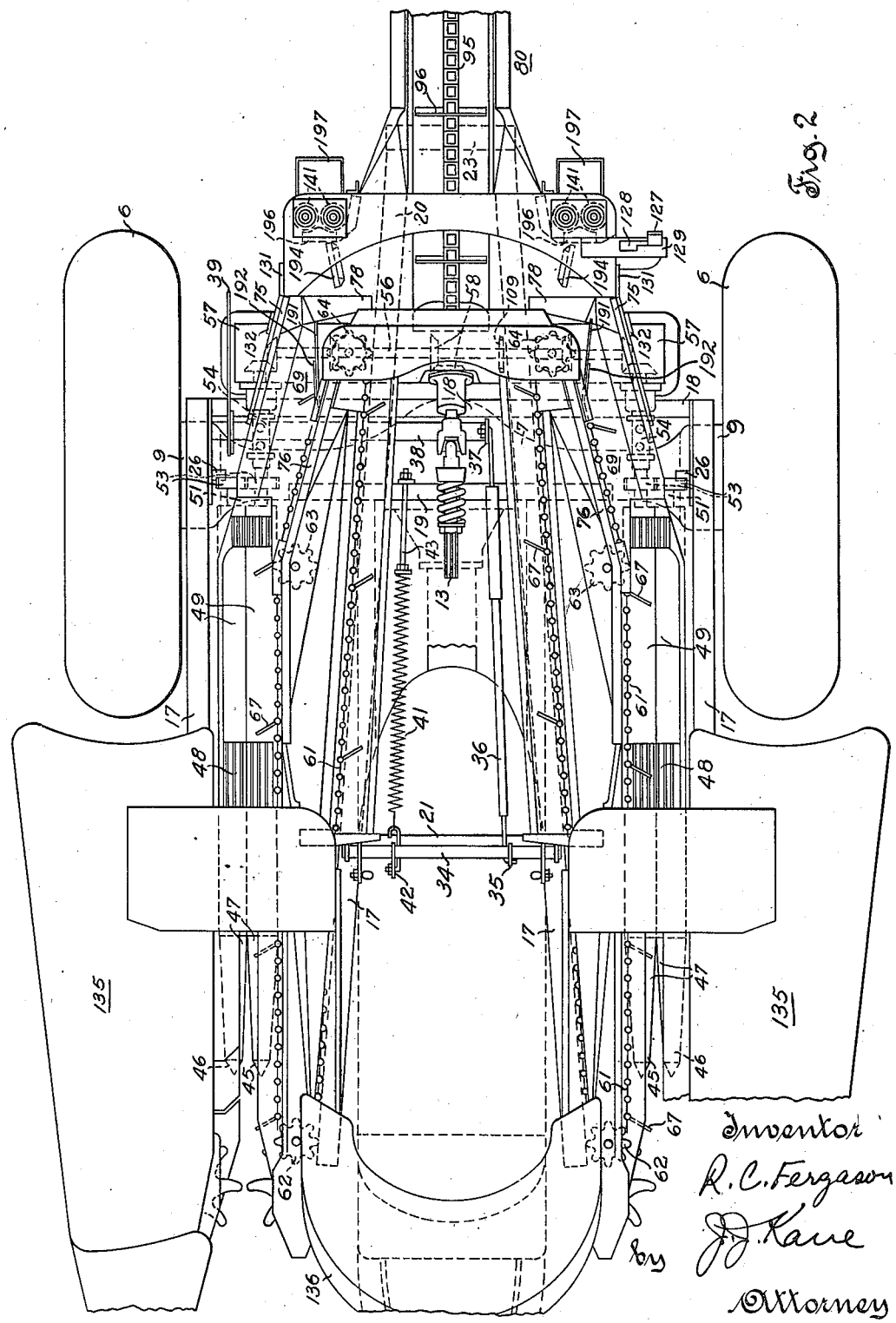

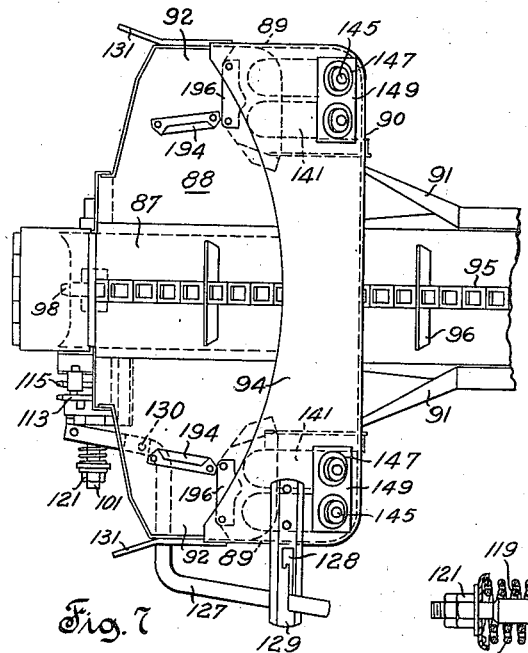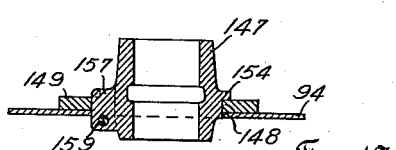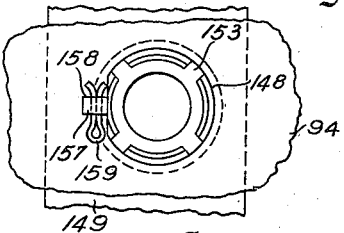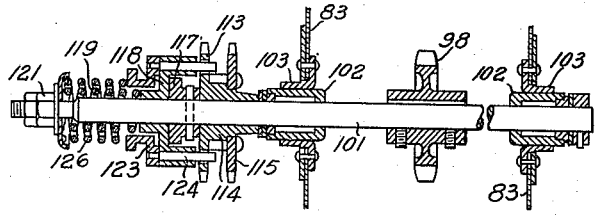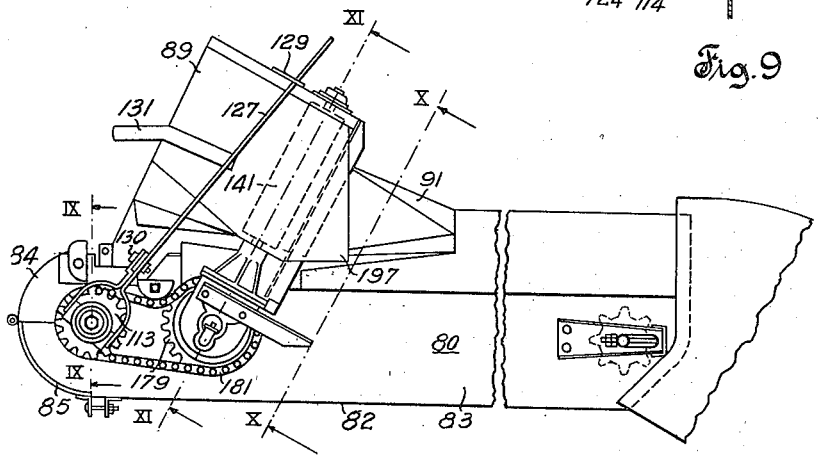

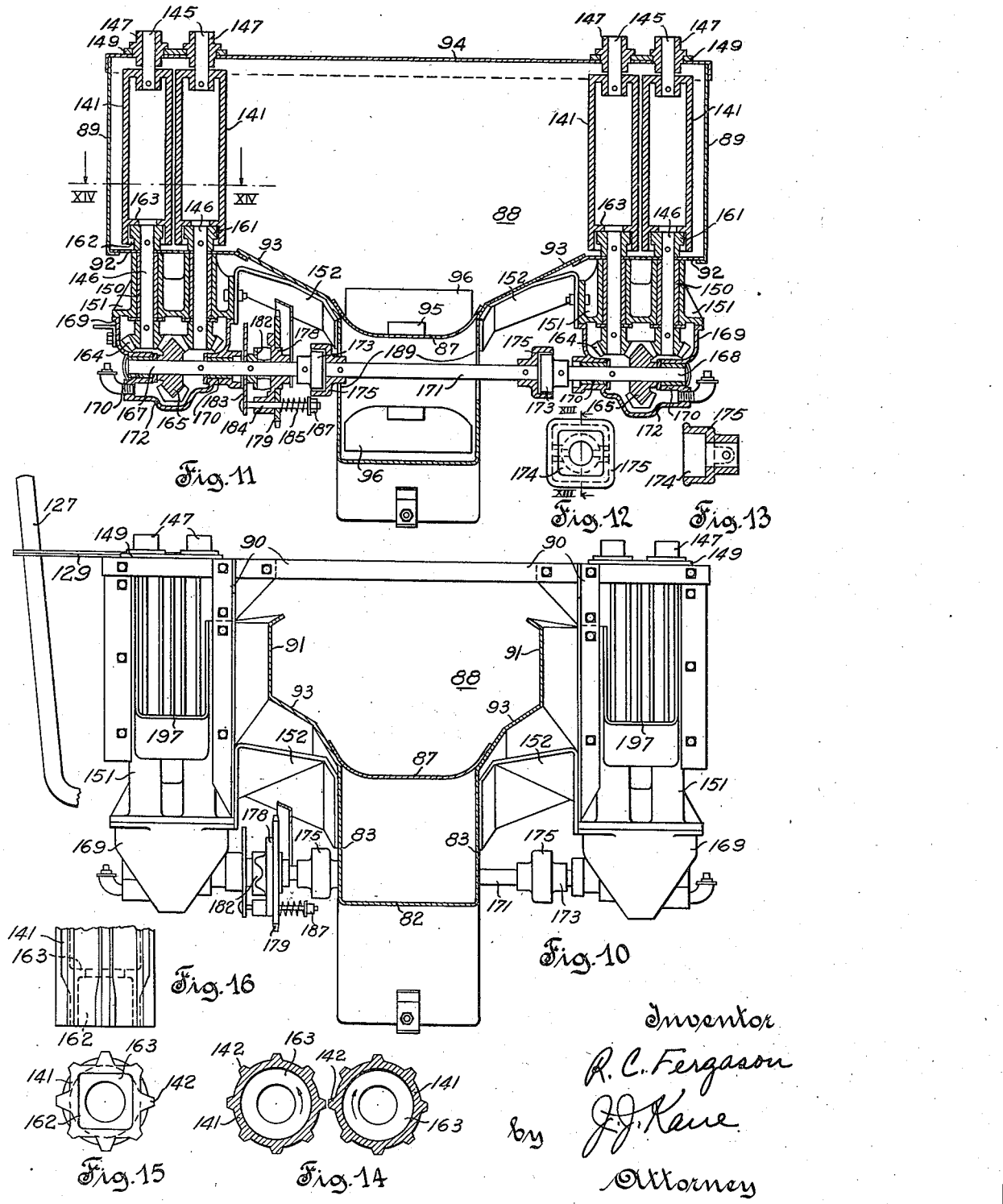

Patented July 6, 1948

2,444,561

UNITED STATES PATENT OFFICE 2,444,561

CORN HARVESTER

Rector C. Fergason, La Porte, Ind., assignor to Allis-Chalmers Manufacturing Company, Milwaukee, Wis., a corporation of Delaware Application July 16, 1943, Serial No. 494,912

2 Claims. (Cl. 56—18)

This invention relates in general to implements for harvesting corn and the like, and the invention finds particular utility in corn harvesters which, in their travel through the field, propelled by a tractor or the like, pick the ears of corn from the standing stalks and preferably remove the husks from the ears and convey the latter to a suitable collecting receptacle.

Corn harvesters are required to operate under varying atmospheric and temperature conditions which have definite and considerable effect on the corn stalks. Under some conditions, as when the stalk is unusually dry or it has been subjected to freezing after rain or snow, the stalk is relatively brittle, and during the picking operation by the harvester, pieces of stalk are broken off and may be carried rearwardly along the picking rolls with the picked ear of corn; and where the picked ears are then subjected to the action of husking rolls, stalk portions may be carried along with the husked ears, with the general result that the harvested ears, whether they are merely picked or picked and husked, are carried to the collecting receptacle or vehicle with pieces of stalk trash accompanying the ears.

The present invention is directed toward and contemplates the provision of a harvester with improved facilities, and of such design and construction as to involve a minimum of added weight and cost in connection with the harvester, for accomplishing the removal of stalk and like trash from the harvested ears of corn or the like during the operation of the harvester, thus avoiding additional expense or time consumed in removing such stalk trash from the collected harvested ears.

Particularly desirable results and advantages are obtainable through the use of features of the present invention in connection with corn harvesters of the type wherein the harvester is of the tractor-mounted type and having one or more pairs of cooperative picking or snapping rolls which serve to remove the ears of corn from the stalks, and wherein the picked ears are conveyed therefrom to cooperative husking rolls for removing the husks from the ears, the husked ears being then conveyed or discharged to a collection point. In the attainment of desired results and advantages in a corn harvester embodying the present invention, stalk-ejecting devices are provided in such position and in such relation to the other operative parts of the harvester as to receive pieces of stalk which are carried along with the harvested ears, and to eject such stalk refuse to the ground or otherwise, while permitting the harvested ears to be collected free of such stalk refuse.

Additional advantages are obtainable in accordance with this invention through providing stalk-ejecting mechanism of improved design and assemblage with respect to other parts of the harvester, and preferably driven by the same source of power, such as the engine of the propelling tractor, as other elements of the harvester and serving as a unitary part of the complete harvester assembly.

Further advantages are concerned with the mounting of the stalk-ejecting mechanism in conjunction with the receiving well or hopper of the elevating conveyer of the harvester assembly and in such relation with respect to the path of travel of harvested ears of corn or the like to the hopper as to permit the reception of the harvested ears in the hopper, and at the same time insure the collection of stalk refuse and its discharge to a point outside of the hopper.

Objects of this invention are concerned with the provision of a harvester, including mechanism for ejecting stalk refuse from the stream of harvested ears of corn or the like, which is of an improved design and construction contributing to the attainment of the aforesaid and other structural and operating advantages.

Objects and advantages attainable through the present invention will be apparent from the description herein and the accompanying drawings, disclosing an embodiment of features of the invention, and will be more particularly pointed out in the annexed claims.

In the accompanying drawings:

Fig. 1 is a view in side elevation, with parts broken away or removed, and other parts in section, of a tractor-mounted corn harvester assembly embodying features of the present invention;

Fig. 2 is a diagrammatic plan view of the apparatus of Fig. 1, with parts removed, in its relation to the tractor;

Fig. 3 is a front elevation of the elevating conveyer of the corn harvester of Figs. 1 and 2, and disclosing features of the stalk-ejecting mechanism;

Fig. 4 is a fragmental sectional view, in the plane of the line IV—IV of Fig. 1;

Figs. 5 and 6 are fragmental sectional views in the planes of the lines V—V and VI—VI, respectively, of Fig. 4;

Figs. 7 and 8 are a plan view and a side elevation, respectively, of the lower end of the elevating conveyer and associated parts;

Fig. 9 is an enlarged fragmetal sectional view in the plane of the line IX—IX of Fig. 8;

Fig. 10 is a rear elevational view, with parts in section, in the plane of the line X—X of Fig. 8, of the lower portion of the elevating conveyer;

Fig. 11 is a sectional view in the plane of the line XI—XI of Fig. 8;

Fig. 12 is a view in side elevation, viewed from the right in Fig. 11, of a detail shown in Figs. 10 and 11;

Fig. 13 is a view in vertical section, in the plane of the line XIII—XIII, of Fig. 12;

Fig. 14 is a sectional view in the plane of the line XIV—XIV of Fig. 11;

Figs. 15 and 16 are a bottom plan view and a fragmental side elevation, respectively, of one of the ejecting rolls shown in Figs. 10 and 11;

Figs. 17 and 18 are a fragmental vertical sectional view and a bottom plan view, respectively, of a detail of the mounting for the ejecting rolls shown in Figs. 10 and 11.

In the embodiment of the invention illustrated in the drawings, a conventional form of tractor, indicated at 2, includes a supporting frame 3 carrying a conventional engine 4 having conventional control elements (not shown). The tractor frame is supported on a pair of steerable front wheels 5 whose axles are suitably hung from the frame, and a pair of traction wheels 6 carried by a rear axle housing 7 supported on or integral with the rear portion of the tractor frame. This rear axle housing is preferably of the drop type wherein the center portion encloses a differential drive, actuated from the engine through the usual transmission shaft 8, and wherein depending side portions 9 of the housing enclose conventional gear connections from the differential drive to the axles of the traction wheels 6. A power take-off connection 11, suitably driven from the engine, or a variable speed transmission device associated therewith, drives a flexibly connected power-take-off shaft 12, the latter being suitably formed at its rear end for conventional detachable splined connection to a correspondingly splined forward end of a flexible drive shaft, indicated at 13, carried by an implement associated with the tractor. An operator's seat 14 is suitably mounted on the engine frame or rear axle housing in desired position with respect to the tractor controls.

A corn harvester is shown as comprising a frame 16 including a pair of built-up side frame elements 17, these side frame elements, each including a pair of longitudinally extending frame bars spaced apart transversely, being arranged to be disposed one at each side of the tractor and lying within the tread of the rear traction wheels, when the harvester is assembled on the tractor. These side frames are assembled as a unitary part of the harvester frame through cross-bars 18 and 19 connecting downwardly inclined and rearwardly extending portions 20 of the inner ones of the pair of frame bars constituting the side frames and through a cross-bar 21 at a forward position. A cross-bar 23 serves to connect, preferably in a detachable manner, the rear ends of the frame bars 20 of the frame.

The harvester frame 16 is provided with horizontally alined pintles or pivot pins 26 serving to pivotally mount the harvester frame on the tractor, these pivot pins extending inwardly from side portions of the harvester frame into rearwardly opening bearing recesses in bracket members 27 supported by the depending side portions 9 of the tractor rear axle housing. These pivot pins 26 are in such position that, with the harvester frame suitably supported in position on the ground, the tractor may be moved rearwardly over the harvester-thresher until the bearing recesses of bracket members 27 receive the pivot pins 26; and retaining pins 28 may then be inserted to hold the pivot pins in operative position within the bearing recesses.

The forward end of the harvester frame is adjustably supported in position on the tractor by means of hanger bars 31 detachably pivotally connected to the tractor frame, one at each side thereof, the lower ends of these hanger bars being connected to arms 32 on a cross-bar 34 suitably mounted for limited rotation on the side frame elements 17, and through an arm 35 on such cross-bar, to a preferably yieldably extensible, suitable operating rod 36. This operating rod 36 is connected, through an arm 37, to a rod 38 mounted for limited rotation on the frame; and an actuating lever 39 connected to the rod 38 serves, through the actuating linkage described herein, to determine the position of the forward end of the harvester frame with respect to the ground. A spring 41, connected at its forward end to an arm 42 on the rotatable bar 34 and having an adjustably fixed connection 43 at its rear end to the cross-bar 19, serves to counterbalance the greater portion of the unbalanced weight of the forward end of the harvester frame and parts supported thereby, so as to facilitate ready adjustment by the tractor operator of the position of the harvester frame, through operation of the lever 39.

Mounted in operative position on each of the side frame elements 17 is a pair of harvesting rolls 45, 46, the rolls of each pair including forward picker sections 47, intermediate sections 48 through which leaf trash is removed, and rearward husking sections 49 mounted in front to rear alinement at a point below the tractor frame, and having journal portions at the rear end supported in bearings 51 carried by the frame and suitably disposed forward journals between the picking and trash-removing sections, mounted in bearings carried by the frame as indicated at 52. The rearwardly extending shaft or journal portions of the harvesting rolls are provided with meshing spur gears 53, and one of these shaft extensions is driven through a flexibly connected driving shaft 54, to impart desired opposite rotation to the geared roll shafts. The shaft 54 is driven, through a suitably geared connection, from a transverse driving shaft 56 of a power transmission device enclosed within a housing 57 suitably supported on the harvester frame, and driven through a suitable connection from the shaft 13, such connection including a bevel gear connection 58.

A combined gathering and conveying chain 61 is operatively mounted on guide sprockets 62 and 63 rotatably mounted on the inner portion of each side frame element 17, and a driving sprocket 64, rotatably mounted on a shaft extending upwardly from and rotatably mounted in the housing 57 and suitably driven from the transverse shaft 56 of such transmission device. The outer course of each gathering and conveying chain 61 travels rearwardly, with the flights 67 thereon passing rearwardly above or over the space between the upper portions of the inner and outer harvesting rolls 45, 46; and the chain 61 serves to carry the standing stalks rearwardly toward and into the space between the picking sections 47 of the rolls and to convey the ears of corn, after the latter are snapped from the stalks, rearwardly and upwardly along the husking sections 49 of rolls, to remove the husks from the ears, and thence rearwardly along the conveyer trough 69 formed over the husking rolls and extending beneath the tractor rear axle housing 7, and having a bottomed portion extending rearwardly therefrom over the housing 57 of the power transmission device. The trough 69 in which the flights 67 of the gathering and conveying chain 61 operate and along which the husked corn is conveyed is formed with outer and inner side walls 75 and 76, respectively, the rear portions of which are inclined inwardly toward the longitudinal center line of the harvester frame; and the rear end portion of the outer side wall 75 is extended upwardly to an appreciable extent. A rearwardly and downwardly extending discharge lip 78 is associated with the rear end of the bottom wall of the trough 69.

An elevating conveyer 80 is mounted on the rear portion of the harvester frame 16, this conveyer including a housing having a bottom wall 82 and substantially parallel vertical side walls 83 provided with an outward flare adjacent their upper edge portions. The bottom wall at its forward end is extended upwardly, along a generally semicircular arc, as indicated at 84, the lower part of this arc-shaped wall being preferably in the form of a door or cover 85 pivoted at its upper edge and swingable to open and closed position, in which latter position it may be secured by a suitable catch or detachable bolt, as indicated in Fig. 8. A transverse partition wall 87 extends across the space between the parallel vertical portions of the side walls 83 of the conveyer housing throughout substantially the full longitudinal length thereof. Adjacent the forward end, the upper portion of the side walls 83 are flared or built up outwardly, above the transverse partition 87, to produce a receiving wall or hopper 88 open at its forward edge across a width substantially equal to the distance between the rear edges of the outer walls 75 of the conveyer troughs 69. This forward flared portion of the side walls of the conveyer 80 may be formed mainly of suitably shaped and joined sections of sheet metal, to form in conjunction with the transverse partition 87, the well or hopper 88 having side walls 89, and an open work frame 90 at the rear edge of the hopper and including a pair of spaced vertical frame bars at each side of the hopper and an upper cross-bar secured to and bracing the vertical frame bars. Outwardly flared sections 91 of the side walls 83 of the body of the conveyer have their forward edges connected to, and braced by bolting the same to the inner vertical elements of the frame 90, as indicated in Fig. 10. And the bottom wall of the hopper is made up of outer sections 92 joined to the side walls 89 and downwardly inclined inner sections 93 merging into and joined to the partition 87, to complete the bottom wall of the hopper or well. The side walls 89 of the hopper are further braced by a stiff plate 94 extending transversely across and secured to the upper edges of the rear part of the side wall portions 89 and the upper edge of the open-work frame 90.

A conveyer chain 95 having flights 96, the upper course of which travels at the upper side and the lower course of which travels beneath the partition wall 87, serves to convey harvested corn from the receiving well or hopper 88 of the conveyer to the discharge end thereof. At its forward end, this conveyer chain passes over and is driven by a sprocket 98 on a transverse shaft 101, mounted in bearings 102 of bearing housings secured in the forward vertical portion of the side walls 83 and having machined portions extending outwardly therefrom to serve as hollow pintles or pivots 103. These pivots 103 are removably inserted in rearwardly opening bearing recesses in brackets 104 carried by the rearwardly extending spaced arms 20 of the harvester frame, and are held in normal position in the bearing recesses by removable latch pins 105. With the pivots 103 in position in their bearings, the conveyer 80 may be swung in a vertical plane to normal position or degree of upward inclination, indicated in Fig. 1, and held therein by reach rods 107 attached at their rear ends to, and preferably pivotally mounted on, the side wall portions 83 of the conveyer housing, and with their forward ends loosely pivotally attached, preferably in a detachable manner, to brackets 108 on the rear axle housing of the tractor.

The driving sprocket 98 for the conveyer chain 95 is driven by a sprocket 109 on the transverse shaft 56 in the housing 57 through a driving chain 112, passing through an opening in the lower wall of such housing and over a sprocket 113 whose hub 114 is loose on the shaft 101. The chain 112 can be opened readily, as is well known in the driving chain art, at one or more points for facility in assembling the chain on and removing it from the sprockets, the closure plate 85 at the forward end of the conveyer housing, when such closure plate is raised to open position, facilitating such operation. A second sprocket 115, referred to hereinafter, is mounted on the hub of the sprocket 113.

A clutch element 117 is secured to the shaft 101, outside the sprocket 113. The outer face of the clutch element 117 is provided with a suitable clutching surface, and an adjacent clutching surface on a clutch element 118, loose on the shaft 101, is such as to frictionally engage the clutching surface of the element 117, the co-operative clutching surfaces being such as to form a conventional ratchet type of overload release clutch, the element 118 being urged into clutching relation with the element 117 by a spring 119 engaging the end of a tubular portion of the clutch element 118 and held in compression to the desired extent by a washer and an adjustable nut 121 on the outer end of the shaft. An annular element 123 is mounted, through a sleeve portion thereof slidable over the spring 119, on a tubular outer extension of the clutch element 118 and is provided with a radial flange at its outer end. Axially extending pins 124 secured to the element 123 project through spaced apertures in the element 118 and the sprocket 113 or its hub and, with the parts in this condition, form a normal driving connection from the latter, through the clutch parts on the element 118 and the element 117, to the shaft 101. A compression spring 126, preferably lighter than the spring 119, surrounds the latter spring and bears at its inner end against the radial flange on the element 123 and is held in compression by the nut 121. The normal driving connection between the sprocket 113 and the shaft 101 may be broken at will through a clutch lever 127 pivoted on a bracket attached to the conveyer housing, as indicated at 130, and having a conventional form of operating connection with the element 123, and the handle of the clutch lever extending to a point within easy reach of the tractor operator. On suitable actuation of the lever 127, the element 123 is drawn outwardly, against the action of the spring 126, until the driving pins 124 are fully withdrawn from the apertures in the sprocket 113, at which time the hub 114 of the latter is free to rotate on the shaft. The lever 127 is suitably held in non-driving position by fitting into an enlarged portion, as indicated at 138 in Fig. 2, at the inner end of a recess 128 of a bracing bar 129 secured to the top cover plate 94 of the well or hopper of the conveyer.

Operation of the clutch lever 127 does not disturb the normal driving relation between the clutch elements 117 and 118 which are independently held in clutched relation by the inner spring 119. However, if the load on the driving shaft 101 should at any time exceed a predetermined amount, the spring 119 will yield to a sufficient extent to cause the ratchet clutching surfaces of the clutch elements 117, 118 to slip, so that the clutch member 118 slides back and forth along the shaft, permitting relative rotation of the driving and driven parts. However, the driving pins 124 are of sufficient length that they do not wholly disengage from the apertures in the sprocket 113 when the clutch 118 slips. Complete disengagement of the driving pins 124 is effected only through operation of the clutch lever 127.

With the elevating conveyer in normal operative position, the forward edges of the side wall sections 89 of the well or hopper 88 of the conveyer are closely adjacent the rear edges of the outer side walls 75 of the conveying trough 69, with forwardly extending pins or rods 131 on such side walls fitting snugly in recessed brackets 132 on such trough walls 75, and thus definitely positioning the forward end of the conveyer 80; and the discharge lips 78 of the troughs 69 are over the forward portion of the bottom wall of the well or hopper portion 88 of the conveyer.

The side frame elements 17 supporting the corn harvesting rolls and the gathering and conveying mechanism are provided with shields of conventional form, and preferably detachably mounted on the side frames, the outer shields being indicated at 135; and a center divider shield 136, preferably of sectional design and of heretofore known form, is mounted on the forward end of the tractor frame.

Where the machine is harvesting in a field where the stalks are brittle, due to being unusually dry or having been frozen, broken pieces of stalks frequently are carried along over the harvesting rolls and through the conveying trough 69, along with the harvested ears, these pieces of stalks lying generally lengthwise in their passage across the discharge end of the trough. In order to avoid the collection of such stalk refuse and its discharge, along with the harvested ears, by the conveyer 80 to the collecting receptacle for the harvested ears, such as a trailing wagon that may be drawn by the tractor, stalk collecting and ejecting mechanism is provided to eliminate the tendency of collecting such refuse, along with the harvested ears. The stalk-ejecting mechanism is suitably mounted in position on the harvester frame at a point rearwardly of the discharge ends of the conveying troughs 69 at a point which insures the collection of the harvested ears in a suitably formed hopper portion of the elevating conveyer and free of stalk refuse, and also insures the collection and ejection of stalk refuse to the ground.

The stalk collecting and ejecting mechanism as shown herein is mounted on the rear portion of the well or hopper 88 of the elevating conveyer 80, within the confines of such hopper, and it includes a pair of cooperative, oppositely rotating ejector rolls 141 suitably mounted and operatively associated with respect to each conveyer trough 69 through which any stalk refuse is carried, along with the harvested ears, rearwardly toward the receiving well of the elevating conveyer. The rolls 141 have corrugated surfaces providing teeth 142 which grab or grip the pieces of stalk as they project and pass from the conveyer trough and draw them through the rolls, discharging the stalk to the ground or other point of collection outside of the path of the harvested ears through the elevating conveyer 80. With the rolls 141 of each pair set so that corresponding teeth of the two rolls, at their nearest point of approach, are approximately opposite each other, with a small space therebetween, as indicated in Fig. 14, the pieces of stalk refuse are effectively gripped by and discharged through the rolls. These stalk ejecting rolls are positioned rearwardly of the discharge end of the conveying trough 69 at a sufficient distance therefrom to permit harvested ears to drop onto the partition wall 87 at the bottom of the receiving well or hopper and move into the path of the conveying chain 61, and still sufficiently close to the discharge ends of the troughs to receive a portion of the stalk as it is projected rearwardly from the discharge end of the trough.

As indicated herein, the stalk ejecting mechanism is associated with and supported on the receiving well or hopper 88 at the forward end of the conveyer 80. The pairs of cooperative ejector rolls are provided with upper and lower journal portions 145, 146, respectively, separately formed and secured, as by shrinking, welding, pinning or otherwise, within the hollow body portion of the rolls 141. The upper journal portions 145 of the rolls rotate in bearings 147 removably secured in position in apertures 148 in the upper plate 94, and preferably a reinforcing or stiffening plate 149 secured thereto, of the hopper; and the lower journal portions 146 rotate in bearings 150 carried by a bearing housing 151 preferably removably supported in position on a hanger 152 mounted on an adjacent portion of the lower wall of the receiving hopper.

The lower portions of the bearings 147 are preferably provided with circumferentially spaced external ears or projections 153 whose outer periphery is machined to have a close guiding fit with the walls of the aperture in the plate 149 and the plate 94. The bearing is provided with an external annular flange 154 adapted to lie against the upper side of the plate 149, and this flange has one or more radial extensions 157 fitting closely into a corresponding slot 158 in the plates 94 and 149. The bearing is inserted to position through the aperture in the plates 94 and 149, from the upper side thereof, with the radial extension 157 fitted into the slot 158, to hold the bearing against rotation; and with the bearing thus inserted to position and the flange 154 resting on the plate 149, it is held in place therein by a pin or cotter 159 passing through and held in position in an aperture in the radial extension 157 and bearing at its upper side against the adjacent surface of the top plate 94.

The upper end of the lower journal portion 146 of each roll 141 is connected in driving relation to the roll through a collar 161, of polygonal shape in cross section, pinned or otherwise secured to the journal portion and fitting within an axial recess 162, of corresponding polygonal shape, in the lower end of the roll. The weight of the roll is transmitted through an internal flange 163 thereon, resting on the upper face of the collar 161; and the bottom section 92 of the hopper on which the collar 161 rests, takes the thrust of the roll during operation. The lower end of each journal portion 146 has a bevel gear 164 suitably secured thereto and meshing with teeth of a double bevel gear 165 on a transverse shaft section 167, at the left hand side as viewed in Fig. 11, or a shaft section 168 at the opposite side of the hopper. The shaft sections 167 and 168 are each rotatably mounted in bearings 170 carried by a housing 169, preferably detachably mounted in a conventional manner on the lower side of the bearing housing 151, and providing a lubricant receptacle 172 for the meshed gears.

The shaft section 168 is detachably connected in driven relation with respect to the shaft section 167 through a connecting shaft 171 passing through openings 189 in the opposed side walls 83 of the elevating conveyer 80. A preferable form of detachable driving connection between the shaft sections 167 and 168 includes a coupling collar 173 secured on the inner end of each shaft section 167, 168, this collar having its inner end of polygonal cross-section and fitting into a correspondingly shaped axial recess 174 in the outer side of a coupling collar 175 detachably secured in position, as by a removable pin or screw, at the outer ends of the connecting shaft 171. With the coupling collars 175 disconnected from the shaft 171, these collars may be slid inwardly along such shaft to a position where the collars 173 are wholly separated from the collars 175, the opening 189 in the adjacent wall 83 of the elevating conveyer being of sufficient size to permit the collar 175 adjacent the shaft 167 to slide clear of the collar 173 on such shaft; and the housings 169, with the shaft section 167 or 168 and the parts carried thereby, may be removed from or replaced in operative position.

The supporting hub 178 of a sprocket 179 is mounted in freely rotatable relation on the shaft section 167, in operative alinement with the sprocket 115 on the shaft 101; and a chain 181 serves to drive the sprocket 179 from the sprocket 115. A clutch, of the spring pressed ratchet type, having cooperative clutch surfaces of conventional type formed on the hub 178 and on a collar 182 fixed to the shaft section 167, serves to normally establish the driving relation between hub 178 and collar 182, through the action of a bearing collar or washer 183 loose on the shaft section 167 and provided with inwardly projecting pins 184 passing through spaced openings in the sprocket 179 and its supporting hub 178; and compression springs 185 on the pins 184 and disposed between the inner side of the sprocket 179 and a bearing washer and nut 187 at the inner end of the pins serve to hold the clutch parts of the hub 178 and the collar 182 in desired driving relation. As will be apparent, on the occurrence of an excessive load on the driven shaft 167, the clutch portion on the hub 178 releases inwardly, against the action of the springs 185, to an extent to permit the sprocket 179 to rotate independently of the shaft 167, thus limiting the load that may be carried by the shaft 167.

To facilitate the collection of stalk refuse and its proper ejection, a deflector shield 191, preferably in the form of a plate of spring metal and having reinforcing backing or mounting plate 192 of spring metal, is secured in position in each of the conveyer troughs 69, the deflector shield being mounted on the inner side wall 76 of the conveyer trough, as by being bolted thereto, and projecting rearwardly therein and at an inclination toward the outer side wall 75 of the trough, and with the lower edge of the shield clearing the path of the flights 67 of the conveying chain 61. Pieces of stalk passing rearwardly through the trough, and usually lying over the husked ears, striking against the deflecting shield 191, are deflected by the shield so as to be discharged from the trough along the outer side or edge of the trough at a point and in a direction which causes their discharge toward the space between the adjacent pair of ejector rolls 141, the shield yielding to some extent to the striking effect of heavy pieces of stalk and any husked ears that may contact the shield.

On the bottom wall of the well or hopper 88 at the forward end of the elevating conveyer 80, a stalk deflector in the form of a deflector plate 194, is secured to the forwardly and downwardly sloping side portions of such bottom wall, this deflector extending toward the space between the pair of adjacent ejector rolls and serving to guide any pieces of stalk, discharged from the conveyor trough 69, toward the space between these rolls. A second deflector plate 196, secured to the bottom wall of the hopper is disposed rearwardly of the deflector plate 194, the active deflecting rear portion of the plate 196 rising upwardly to a point substantially above the lower edge of the adjacent ejector rolls 141 and extending into proximity to the adjacent forward edge of such rolls. The upwardly rising deflector plate 194 serves to guide any pieces of stalk upwardly into the space between the ejector rolls, so as to contact the rolls at points substantially above the bottom edge of the rolls, and thus insure that the pieces of stalk will not be forced or drawn beneath the lower edge of the rolls.

The open work frame 90 constituting the rear wall of the outer portions of the hopper 88 of elevating conveyer 80, at points opposite the ejector rolls 141 and laterally outside of the adjacent active portion of the conveyer, provides openings to permit rearward passage therethrough of stalks ejected by the rolls. A discharge lip or apron 197, having side walls and formed on or secured to portions of the frame 90 at the rear wall of the hopper, serves to guide the ejected stalks and insure their discharge to the ground, and also to collect any shelled corn knocked off any ears, coming in contact with the ejector rolls, and deflect such corn to the hopper.

The elevating conveyer and its appurtenant parts, including means for operating same, comprises a material removing structure which can be readily removed from operative position by detaching the forward ends of the reach rods 107 from the brackets 108 on the tractor and swinging these rods on their pivotal points of attachment to the side walls 83 of the elevating conveyer until the forward ends of such rods rest on the ground; and the conveyer may be swung down to a point where the guide pins 131 move out of the recessed brackets 132 on the walls 75. Access may be had, through the closure 85 at the lower forward end of the elevator housing, to the driving chain 112 to open the latter; and with the latch pin 105 removed from the bearing brackets 104, the tractor may be driven forward until the brackets 104 are free of the pivot pins 102, with the lower forward end of the elevating conveyer then suitably supported from the ground. It will be apparent that with a reverse sequence of operations, the elevating conveyer and the appurtenant parts, that is the material removing structure, may be assembled in operative relation with respect to the tractor and the picking and husking elements of the harvester.

With the harvesting apparatus mounted in assembled operative relation on the tractor, as the latter travels through the corn field, the ears of corn are picked or snapped from the standing stalks of two adjacent rows, and the picked ears travel rearwardly over the husking roll sections which serve to remove the husks from the ears, the husked ears being conveyed rearwardly, beneath the tractor rear axle housing, along the troughs 69 and passing the spring deflector shield 191, thence passing over the discharge lip or apron 78 of the trough into the hopper or well 88 of the elevating conveyer 80 where the ears of corn accumulate over the partition wall 87 and in the path of the traveling flights 96 of the conveyer chain which serves to elevate the ears and cause their discharge to a trailing wagon. Pieces of stalk refuse of any appreciable size that are carried along with the husked ears are conveyed past the spring deflector shield 191, being guided thereby toward the outer side of the trough into a position whence they are projected endwise toward the adjacent ejector rolls 141. The deflector plates 194 serve to guide the ends of the pieces of stalk toward the space between the adjacent oppositely rotating ejector rolls 141, and the deflectors 196 serve to elevate stalks to a position where they engage and are gripped by the body portion of the rolls. The stalks, as they are ejected from the rolls, pass over the discharge apron or lip 197 and drop therefrom to the ground.

Through provision of a harvester of the type disclosed and including the stalk ejector devices and appurtenant operating mechanism and devices for suitably guiding the stalk refuse, while permitting the collection of the harvested ears in the path of the chain conveyer of the elevator, the collection of the harvested ears, relatively free from stalk refuse, is insured.

It should be understood that the invention is not limited to the specific details of design and construction described herein and that the invention also includes such other forms and modifications as are embraced within the scope of the annexed claims.

It is claimed and desired to secure by Letters Patent:

1. In a tractor mounted corn harvester of the type including a supporting frame pivotally and detachably mounted on said tractor, including a pair of cooperative harvesting rolls carried by said frame in forwardly extending relation adjacent each side of the tractor, and including a conveying device carried by said frame for moving harvested ears of corn rearwardly from each of said pairs of rolls, an elevating conveyer detachably mounted on said frame and comprising a hopper structure positioned to receive material from both of said conveying devices and including a central ear collecting portion and side portions extending laterally from opposite sides of said collecting portion, said side portions each having an opening therethrough in rearwardly spaced generally alined relation with respect to the discharge end of the adjacent one of said conveying devices, a stalk ejecting device mounted on each of said side portions in adjacent relation with respect to the opening therethrough and in rearwardly spaced relation with respect to the discharge end of the adjacent one of said conveying devices, said stalk ejecting devices each comprising a pair of cooperative upright rolls having shaft portions rotatably supported in bearings carried by said side portions, and driving connections for said shaft portions comprising a transverse drive shaft section accessibly mounted on said hopper structure below each of the laterally extending side portions thereof, and an intermediate transverse shaft section carried by said collecting portion and detachably connected to the opposed ends of said transverse driving shaft sections.

2. In a tractor mounted corn harvester of the type including a supporting frame pivotally and detachably mounted on said tractor, including a pair of cooperative harvesting rolls carried by said frame in forwardly extending relation adjacent one side of the tractor, and including a conveying device carried by said frame for moving harvested ears of corn rearwardly from said pair of rolls, an elevating conveyer detachably mounted on said frame and comprising a hopper structure positioned to receive material from said conveying device and including a central ear collecting portion and a side portion extending laterally from said collecting portion, said side portion having an opening therethrough in rearwardly spaced generally aligned relation with respect to the discharge end of said conveying device, a stalk ejecting device mounted on said side portion in adjacent relation with respect to the opening therethrough and in rearwardly spaced relation with respect to the discharge end of said conveying device, said stalk ejecting device comprising a pair of cooperative upright rolls having shaft portions rotatably supported in bearings carried by said side portion, and driving connections for said shaft portions comprising a transverse drive shaft section accessibly mounted on said hopper structure below the laterally extending side portion thereof, and an intermediate transverse shaft section carried by said collecting portion and detachably connected to an end of said transverse driving shaft section.

RECTOR C. FERGASON.

REFERENCES CITED

The following references are of record in the file of this patent:

UNITED STATES PATENTS

| Number | Name | Date |
|---|---|---|
| 1,042,371 | Baird | Oct. 22, 1912 |
| 1,922,374 | Krause | Aug. 15, 1933 |
| 2,223,704 | Powell | Dec. 3, 1940 |
| 2,340,084 | Scranton | Jan. 25, 1944 |